Feb. 27, 1973  G. H. ROHRBACK  3,718,556
IONIC pH CONTROL

Filed July 22, 1970  3 Sheets-Sheet 1

INVENTOR.
GILSON H. ROHRBACK
BY
ATTORNEYS

INVENTOR.
GILSON H. ROHRBACK
ATTORNEYS 3,718,556
IONIC pH CONTROL
Gilson H. Rohrback, Whittier, Calif., assignor to Magna
    Corporation, Santa Fe Springs, Calif.
Filed July 22, 1970, Ser. No. 57,088
Int. Cl. B01k 3/00; C02c 5/12
U.S. Cl. 204—149                    12 Claims

ABSTRACT OF THE DISCLOSURE

An aqueous system is made either more basic or more acidic by feeding a liquid containing a preponderance of pH changing hydroxyl or hydrogen ions. The pH changing ions are produced at the electrodes of an electrolyzing system. Liquid flowing past one of the electrodes is returned to the aqueous system of which the pH is to be controlled and liquid flowing past the other electrode is discharged. The amount of pH change is controllable, either open-loop or closed-loop. Control may be achieved by several methods including varying the voltage applied to the electrodes and varying the flow rate past one or both of the electrodes.

BACKGROUND OF THE INVENTION

Field of the invention

The present invention relates to control of pH in aqueous systems and more particularly concerns electrochemical methods and apparatus for changing acidity or alkalinity of an aqueous system.

Description of prior art

Control of alkalinity and acidity is desirable and often essential in the maintenance and operation of a variety of aqueous systems. Industrial water includes that used in boilers for steam generation and cooling water employed on a once-through basis or with recirculating cooling towers. Water has many other industrial uses, including common washing of equipment. Such uses may involve high pressure spray for cleaning, use as a carrier in industrial processes, convenient means of disposing of wastes, and incorporation in various products and food.

In order to make the aqueous system more suitable for its intended application, it is commonly treated externally, before it reaches its point of use, and internally, at the point of use.

Water characteristics and problems caused thereby vary widely with the source of water and the particular application of the water system. Among the many problems due to water characteristics are pH, deposition of scale, general corrosion, pitting, and solid content. In almost all of such systems, acidity or alkalinity are major factors that directly or indirectly interact with other water characteristics, or are characteristics that themselves must be closely controlled.

For example, pH of water will affect both scaling tendency and its corrosion rate relative to metal parts of an industrial water system. Generally, too high a pH level is to be avoided because this encourages precipitation of inorganic scale deposits, such as calcium carbonate. Too low a pH level must also be avoided because this usually leads to high corrosion rates, seriously affecting metallic components in contact with the water. For each system, there is usually a preferred or optimum pH range that should be maintained if the other methods of chemical treatment and the desired application of the water system itself are to achieve most effective and economical results. For some systems a high pH, that is, a water of alkaline character is preferred. For other systems such as for example, cooling water systems, a low pH, varying from a slightly acidic to a slightly alkaline condition is generally employed.

As well known, pH is the logarithm of the reciprocal of the hydrogen ion concentration in water. It is generally identified or defined in connection with a scale of numbers from zero to fourteen with the number seven indicating neutral pH values, numbers from zero to seven indicating acidity, and numbers from seven to fourteen indicating increasing alkalinity. The scale employed is derived from the ionization of pure water into hydrogen ions ($H^+$) and hydroxyl ions ($OH^-$). For pure water, the hydrogen ion concentration is $1 \times 10^{-7}$, the exponent of this figure being the source of the neutral pH value of seven. Below a pH of seven, the concentration of hydrogen ions increases and concentration of hydroxyl ions decreases. Above seven the reverse is true.

In most industrial water systems used for cooling, it is necessary to add acid to lower the pH of the system to a level that is desired. Not only is the pH of the supply water itself frequently higher than that desired, but use of the water in the evaporative cooling process often results in an increase of pH.

The heat exchange occurring in the evaporative cooling results in two changes to water composition. First, the total of dissolved solid content increases because of evaporation of some of the water, and second the bicarbonate ions are converted to carbonate because of the escape of carbon dioxide with higher temperature. Accordingly, concentration of the salt content of the water increases. Decomposition of bicarbonate increases the concentration of carbonate. Thus, concentration of salts will build up, the solubility product of the calcium carbonate may be exceeded and precipitation occurs. This precipitation is the troublesome deposit or scale that seriously interferes with heat transfer in the cooling system.

It has long been the practice in cooling water systems to prevent this precipitation of calcium carbonate scale by adding acid (generally sulfuric acid) to reconvert the carbonate to bicarbonate.

Procedures entailed in lowering of pH are troublesome and present complex and potentially hazardous handling problems. Control of pH has generally been accomplished by addition of acid or alkali at a rate required to maintain the desired level of pH. Common acids employed are sulfuric acid and hydrochloric acid. Common bases are sodium hydroxide and calcium hydroxide. Although these chemicals can be added by hand, it is more common to pump these into the system as concentrated solutions.

Systems and equipment for acid addition have been highly developed over a period of many years and include proportional feed systems, constant rate systems, gravity or pressure systems and concentrated acid feed systems or dilute acid feed systems. Drip feeders and decanting feeders are typical gravity units, whereas eductors, air-pressure systems and pumps are typical of the pressure type. For greater precision, closed-loop pH control systems may be employed wherein a detecting instrument senses actual pH of the water and automatically regulates addition of the chemical that is employed to change the pH.

Use of strong acids and bases has many disadvantages from the standpoint of safety, convenience and economy, largely because of the high hazards involved in handling and storage. Concentrated sulfuric acid is usually shipped in glass carboys or in tank trucks or cars, and often requires large scale storage systems capable of receiving a full tank car or tank truck shipment together with adequate reserves. Such acid storage systems and closed-loop pH controls for circulating water system are shown in U.S. Pat. 2,772,779 to D. E. Norris, and in U.S. Patent to P. G. Bird et al., 2,292,650.

Another disadvantage arises from the possibility of over-treating the system so that the pH level will be changed considerably more than desired. In such an arrangement, if upset is caused by excess acid, corrosion rate will be excessive and substantial damage can be done to metal equipment and parts. If the upset is on the alkaline side, large amounts of precipitation of scaling compounds may occur, causing unwanted deposits that will interfere with proper operation of the system.

This inadvertent over-treatment may be caused by a variety of different types of failures. Such failures would include siphoning from the acid or base supply into the system, which could occur where pumps are used to supply chemical treatments. Even though the control circuit has shut off the pump, the chemical treatment solution still may siphon through defective pump. Further, if the chemical treatment is added by means of an automatic solenoid valve, the valve may fail in open position.

Employing complicated and expensive equipment, attempts have been made to avoid such inadvertent feeding of excess chemicals by use of override control from a second sensor. For example, the patent to Word, No. 2,787,281 employs an acid feed that is set to normally add more acid than required and the acid feed is stopped when a pH sensor indicates an overly acidic condition. Pat. No. 3,361,150 t o Horner suggests the use of polarization resistance methods of measurement of corrosion for monitoring and override of acid feed systems. Many other arrangements for monitoring water treatment systems by sensing corrosion to change operating conditions have been known and used for many years.

It will be seen that present methods for addition of acid or alkali materials to control pH are complex, costly, subject to failure and still involve serious difficulties and hazards in handling and storage of dangerous materials.

Known electrolytic processes including the use of ion exchange membranes in electrodialysis systems such as, for example, the "Stackpack" manufactured by Ionics Inc., of Cambridge, Mass., have not been applied nor are they adapted for pH control of industrial water systems. Moreover, use of resin impregnated ion exchange membranes requires complex and costly systems that are not economically practical for such water systems.

Accordingly, it is an object of the present invention to provide a simple and inexpensive apparatus and method for control of pH of an industrial aqueous system that requires no storage, handling, or feeding of potentially hazardous chemicals.

SUMMARY OF THE INVENTION

In carrying out principles of the present invention in accordance with a preferred embodiment thereof, an aqueous liquid is electrolyzed at first and second electrodes, at least some of the liquid electrolyzed at one of the electrodes is mixed with or supplied to the liquid system of which pH is to be controlled, and at least some of the liquid electrolyzed at the other of the electrodes is discharged. More particularly, in one embodiment, a common supply conduit has first and second branches in which are mounted first and second electrodes across which a voltage is impressed. Liquid flowing past one of the electrodes entrains pH changing ions such as for example, H+ ions and is fed to the aqueous system of which the pH is to be controlled. At least some of the liquid flowing past the other electrode entrains pH changing ions, such as OH− ions, generated thereat and is discharged. An additional feature of the invention resides in the provision of a relatively short but unobstructed liquid path between the electrodes and the maintenance of a flow rate past at least one of the electrodes that is sufficient to prevent migration of pH changing ions generated thereat to the other electrode.

DETAILED DESCRIPTION

In general, the embodiment of the present invention that are described herein entail use of a pair of electrodes to electrolyze an aqueous liqud. The water subjected to electrolyss may be that contained within or withdrawn from the system. It may be water that is to be added as makeup water, as water provided from a separate tank, or as water containing other chemical treatments to be added to the system. Water that flows past one of the electrodes is returned to or retained in the system. Water flowing past the second of the two electrodes is either wholly discharged or returned to the system in a considerably lesser amount as compared with the amount of water passing the first electrode and returned to the system therefrom.

The action that occurs is fundamentally that which takes place in a common electrolytic cell. In an electrolytic cell, a pair of electrodes, an anode and a cathode, are electrically connected through an external path to a source of electrical power such as a battery. Current flow in this path is accomplished by means of electron movement from anode to cathode. An electrolytic solution containing positive and negative ions is in contact with both electrodes and provides an unobstructed liquid path therebetween. Current flow in the solution is accomplished by means of ion movement. Negative ions (anions) move to the anode and positive ions (cations) to the cathode. Each ion present in the solution contributes to some extent to the current flow, the relative amount contributed by a given ion being dependent upon concentration and ion mobility of the ion species. The net result of the ion flow is the neutralization of excess electric charges built up at each electrode due to the externally impressed voltage.

Figure 1:
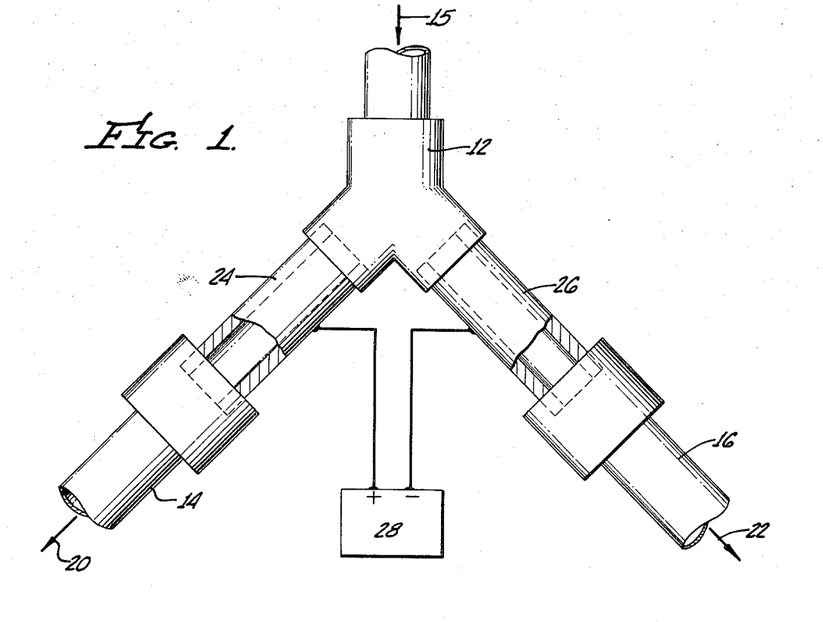
FIG. 1 illustrates an electrochemical acid or base generator employed in the practice of this invention.

Illustrated in FIG. 1 is an arrangement emloying the above-described basic electrolytic cell principles for generation and separation of acidic and basic liquids. A Y-shaped conduit having a main or primary branch 12 and first and second branches 14 and 16 is arranged to receive a supply of an aqueous liquid, flowing in the direction indicated by arrow 15. The liquid supplied at main conduit 12 branches at the Y. Part flows as indicated by arrow 20 through branch 14 and the remainder flows through branch 16 as indicated by arrow 22.

An annular electrode 24, the anode in this example, is mounted in conduit branch 14, and a similar electrode 26, the cathode, is mounted in the branch 16, each electrode being positioned adjacent the junction of the Y. The electrodes 24, 26 are insulated from each other and from the conduit most conveniently, for example, by forming the conduit and its branches of a non-metallic, non-electrically conductive material such as glass or plastic and mounting and forming the electrodes as tubular conductive sections inserted within the conduit branches. A battery or other suitable source of electrical energy 28 is connected to provide a positive potential at anode 24 and a negative potential at cathode 26.

In general, most industrial water normally contains various ionizing compounds, either in the form of salts naturally contained within the supply water or salts provided by various chemical treatments such as the corrosion or scale inhibitors, commonly sodium chromate or polyphosphates. Thus, the liquid flowing through the conduit and contained between the anode and cathode is sufficiently ionized to complete the electrolytic reaction. Nevertheless, as will be more particularly pointed out below, the electrolytic current in the solution is not carried out primarily by ions generated at the electrodes, but by ions normally present in the supply liquid.

In general, two reactions may occur at the cathode, both of which will consume electrons and produce hydroxyl ions:

$$2H_2O + 2e^- \rightarrow H_2\uparrow + 2OH^- \quad (1)$$

$$1/2O_2 + H_2O + 2e^- \rightarrow 2OH^- \quad (2)$$

If strong oxidizers, such as chromates, are employed as inhibitors, these may also be reduced at the cathode:

$$Cr_2O_7^= + 7H_2O + 6e^- \rightarrow 2Cr^{+3} + 14OH^- \quad (3)$$

At the anode, only the following reactions take place:

$$H_2O \rightarrow 2H^+ + 1/2O_2 + 2e^- \quad (4)$$

$$2Cl^- \rightarrow Cl_2 + 2e^- \quad (5)$$

As will be more particularly explained below, it is preferable to employ electrodes which themselves will not be oxidized or reduced under the voltages of the system.

The hydrogen gas produced by the reaction at the cathode may further react with oxygen to form water, the degree of this depolarizing reaction being dependent upon the amount of oxygen available in the system. In general, however, it will be seen that the net result is to produce the acidic pH changing ions (H+) at the anode and the basic pH changing ions (OH−) at the cathode.

In the absence of flow of liquid past the two inert electrodes 24, 26, the hydrogen ions produced at the anode and the hydroxyl ions produced at the cathode will migrate under the potential field toward each other and react to maintain the overall solution surrounding the two electrically neutral. The reaction produces water.

However, if fluid flow past one or both of the electrodes is maintained at a rate high enough to substantially prevent migration of the acidic and basic ions toward each other and toward the opposite electrodes, the acidic and basic ions do not react with each other and are not neutralized. In other words, if a flow of liquid is greater than the velocity of ion migration under the potential difference of the two electrodes, the hydrogen ions will move with the liquid through branch 14 in the direction of arrow 20 and the hydroxyl ions will move through branch 16 in the direction of arrow 22. In this situation, ions such as chloride and sodium ions in the incoming supply water will move as required to provide the necessary charge neutralization in the vicinity of the two electrodes.

The supply water, whether from the system under control or some separate supply, will itself have a relatively neutral pH (between 6 and 8, for example). Accordingly, current in the solution is carried primarily by migration of ions of the ionized salts that are normally present in the water. Thus, the overall result is to preserve substantially all of the difference in acidity between the two separated fluid streams that flow past the respective electrodes.

As illustrated in several systems described below, the electrochemical acid and base generator of FIG. 1 is employed for pH control. This is achieved, for example, by connecting the conduit branch 14 and the acidic pH changing ions therein to an input of the circulating or other water system of which the pH is to be lowered. Contents of the conduit branch 16 with the basic pH changing ions therein are simply discharged.

The reaction of Equation 5, generation of chlorine gas, is not desirable in most systems since chlorine not only fails to alter pH but will also increase corrosiveness of the water. However, in many industrial water systems, chloride ion concentration will not exceed about one-thousand parts per million at which concentration chlorine is not liberated in any significant quantities. Nevertheless, if deemed necessary or desirable, chlorine generation may be minimized by suitable choice of electrode material (platinum being particularly suitable for this purpose) and maintaining a low current density.

Alternatively, if chlorine liberation is a problem, the chloride ion content of supply water may be substantially eliminated by using a separate supply water solution of a sodium salt other than chloride. Sodium sulfate or nitrates are suitable for this purpose. In fact, inorganic salts such as sodium chromates and polyphosphates are conventionally used as corrosion inhibitors and these may serve as suitable electrolytes that involve no chlorine liberation.

As previously indicated, the electrodes are preferably formed of inert or noble metal that may be in the form of conduit couplings positiond just past the branching of the Y junction. Alternatively, the electrodes may be positioned entirely within a continuous conduit and electrically insulated from the conduit by use of conventional insulating feed through bushings. The electrodes are made of material which will not itself enter into the electrical chemical reaction. Requirements for the anode in this connection are more severe than those for the cathode. Inert materials such as carbon and graphite are suitable for either electrode. Highly resistant materials such as platinum, hastalloy or titanium can be used for anodes. All of the foregoing can be used for the cathode and, in addition, less resistant metals such as brass, nickel, and stainless steels.

As will be described in detail below, high flow rates past the electrodes are not required for mutual isolation of acidic and basic pH changing ions generated in the described electrolytic action. The flow past that electrode in the branch that returns to the system is preferably of a turbulent nature, minimizing laminar flow so as to maximize capture and entrainment of pH changing ions to be returned to the system.

In general, current densities of about 0.25 ampere per square foot of electrode surface are suitable. With flow rates of about 0.1 foot per minute past the electrodes, seventy percent current efficiency as described below, is obtained. With somewhat larger flow rates, up to one hundred percent current efficiency is obtained.

Where one electrode is subjected to higher flow rates, higher current densities can be used. Accordingly, the electrode that is subjected to lower flow rates, such as the cathode of the system shown in FIG. 5, for example, may have a considerably greater wetted surface (yielding a lower current density) than the electrode subjected to relatively higher flow rates.

Figure 2:
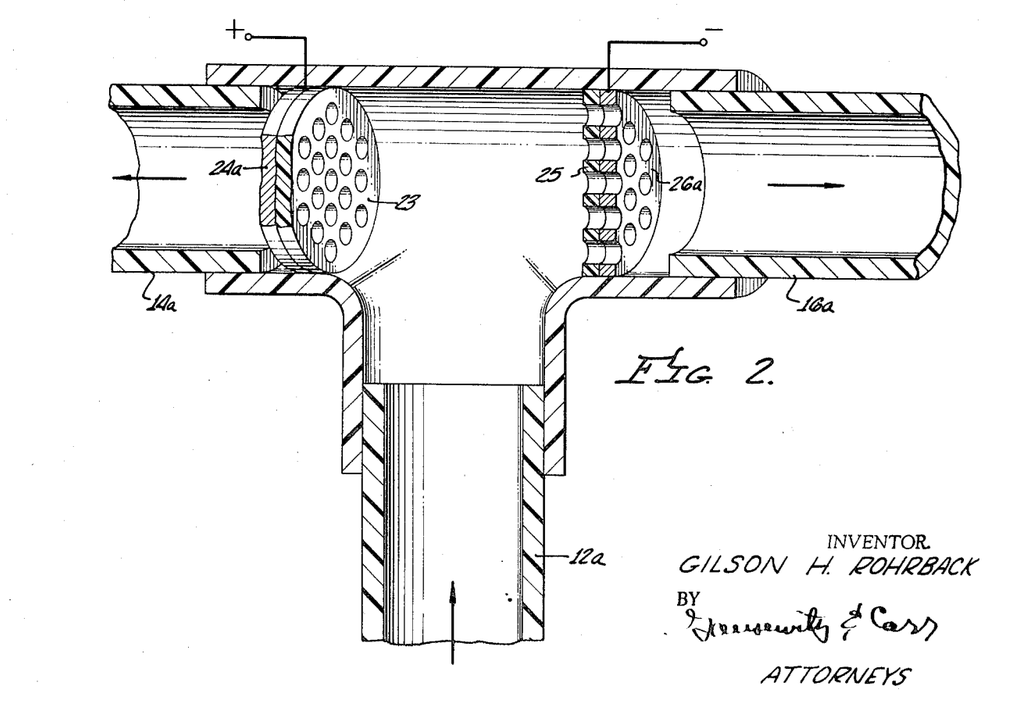
FIG. 2 shows a modified form of electrodes for practice of this invention.

For maximizing entrainment of such ions, the electrodes may be made of a reticulated material, perforated plates or sheets, or otherwise formed of a number of closely spaced electrically connected elements. A typical set of perforate electrodes is shown in FIG. 2. A branched conduit has a primary branch 12a and branches 14a, 16a arranged to flow liquid therethrough as indicated by the arrows. The electrodes, formed as multi-apertured plates 24a, 26a, are securely mounted within and made substantially coextensive with the entrances to the respective branches. Incoming water is received between the plates and thereupon splits into two separate paths through the perforations in the electrodes.

In order to minimize the up-stream wetted surface of these electrodes, a multi-apertured plastic or other non-conductive insulating sheet 23, 25 is fixedly attached to the facing surfaces of the respective electrodes, with the respective perforations in registry. This arrangement enhances the capture and entrainment of all electrochemically generated ion species and minimizes migration of such ions between the electrodes.

Although a battery is illustrated as the source of voltage impressed across the electrodes, it will be readily appreciated that the desired electrochemical reactions may be carried out with impressed currents and voltages that are neither continuous nor single valued. Accordingly, half wave rectified, full wave rectified, or other fluctuating but non-reversing current flows may be provided to the electrodes.

For application of the electrochemical acid and base generator of FIGS. 1 or 2 to a system in which the pH is to be lowered, liquid flow through conduit branch 16 or 16a need not be as great as flow through conduit branch 14 or 14a. Conversely, for use in a system in which the pH is to be raised, flow through branch 14 or 14a may be relatively less.

Decreasing diameter of the conduits 14 and 16 or either of them differentially will increase the differential flow rate, but will also increase electrical resistance of the solution between the electrodes. Accordingly, more power will be required to produce the same concentration of acidic or basic ions. Thus, flow rate should be selected to just overcome ion migration from one electrode to the other. With such minimum flow additional electrode units may be added in parallel to increase the desired production of acidic or basic ions.

EXAMPLE I

As a specific example of application of the present invention to a cooling tower, an electrochemical acid generator has been made by inserting electrodes of perforated platinum foil into sections of tygon plastic tubing of 3/16" inside diameter. Each electrode had approximately 4 sq. cm. of surface area. The two tubing sections were joined by a T and water was flowed by gravity feed into the T where the flow was split with half going past each electrode. Each electrode was spaced five inches from the T-junction. There was no flow obstruction between the electrodes. Flow in each branch was regulated by means of a stopcock in each tube section. Effluent from each tube section was collected for pH measurement. A regulated power supply was used to pass current between the two electrodes.

Water employed in the above example was obtained from a conventional cooling tower and contained six-hundred parts per million dissolved solids, and fifty parts per million sodium chromate. The water had a pH of 6.85 and a resistivity of 860 ohm-cm. This is within a range of typical conditions maintained for optimum tower operation.

Applied DC voltage of 50 volts provided a current flow of 0.75 milliampere between the electrodes. Voltage drop due to solution resistance was 44 volts whereby 6 of the 50 applied volts were actually required to carry out the electrochemical reactions. It may be noted that the solution resistance drop may be minimized by decreasing the length of the solution path between the electrodes.

Flow rate in both branches was adjusted to about 0.6 millilitre per minute and samples were collected. The pH of the samples was measured after one hour of operation and again after twenty-four hours. After one hour, pH of the anode branch was 4.2 and the cathode branch 9.4. After twenty-four hours, pH of the sample collected from the anode branch was 3.5 and of that collected from the cathode branch 9.7.

The linear flow rate in the above example was 1.6 centimeters per minute, demonstrating that low flow is effective in assuring that a substantial number of the pH changing ions produced at the electrodes will move with the solution flow, and further, that the required charge neutralization is attained by appropriate division of negative and positive ions of ionizing compounds contained in the supply liquid.

EXAMPLES II, III, IV

In further tests with the above-identified water and equipment, samples of water from each electrode branch were collected at three different flow rates, in three different tests each lasting for twenty-four hours. The pH was measured for all samples from the anode branch in determined for all samples from the anode branch in order to calculate current efficiencies. Results are listed in the following table:

| Text No.: | Flow rate (feet/minute) | pH anode effluent | pH cathode effluent | Generated acid as measured by titration) milliequivalent) | Current Efficiency (percent) |
|---|---|---|---|---|---|
| 1 | 0.13 | 3.5 | 9.7 | $4.7 \times 10^{-4}$ | 70 |
| 2 | 0.22 | 5.6 | 9.0 | $5.2 \times 10^{-4}$ | 75 |
| 3 | 1.5 | 6.7 | 7.3 | $6.7 \times 10^{-4}$ | 100 |

From the above-described tests, it is seen that current efficiency increases as flow rate past the electrodes is increased to reduce the back flow of desired acid and basic ion species through the solution passed between the two electrodes. Nevertheless, even for high efficiencies, only a relatively low flow rate is required.

EXAMPLE V

This example employed the structure and equipment of the first example and involved tap water to which 1,000 p.p.m. of sodium chloride had been added. The tap water had a total hardness of 360 p.p.m., calculated as calcium carbonate, and contained 86 p.p.m. calcium, 35 p.p.m. magnesium, and 68 p.p.m. chloride. The pH of the water sample after addition of the sodium chloride was 8.1.

The tap water was flowed past the two electrodes at a rate of approximately 0.5 feet per minute. D.C. voltage of 50 volts was maintained across the two electrodes which gave a current of 1.3 milliamps.

Discharge from each electrode was collected and after twenty-four hours the pH was measured, indicating the water from the anode to have a pH of 7.5 and water from the cathode to have a pH of 9.1.

By comparing measured acid equivalents with the equivalent that would be theoretically produced by the reaction described in Equation 4 above, the current efficiency of the process may be determined. In this example, the measured acidity was $1.08 \times 10^{-3}$ milliequivalents as compared to a calculated acidity of $1.2 \times 10^{-3}$ milliequivalents. Accordingly, a current efficiency of about 90% was obtained.

EXAMPLE VI

A test similar to that identified as test No. 1 (Example II) in the foregoing table was carried out except that the disance between electrodes through the connecting conduits was shortened to about one inch. This reduced the ohmic resistance between the electrodes so that a lower voltage was employed to obtain the same current flow between electrodes.

In this situation, voltage required to obtain 0.75 milliamp was 13 volts. After twenty-four hours of flow at a rate of 0.13 foot per minute past the electrodes, the pH of the anode effluent was 4.9, the pH of the cathode effluent 9.4, the generated acid was $4.1 \times 10^{-4}$ milliequivalents, and current efficiency calculated to be about 60%.

Example VI indicates that voltage required to pass a given amount of current may be reduced by reducing the length of the electrolytic path between electrodes and further that as such path is decreased, a greater flow rate is required to assure entrainment of the same number of pH changing ions that are generated at the electrodes.

Voltage requirements will vary with the particular system being treated, the geometry of the electrodes and their spacing, and the current required to generate the required quanity of desired pH changing ions. Even with low current densities, close electrode spacing and electrodes made from material having low over-voltage characteristics such as for example, platinum, voltages of at least two volts are required for any useful passage of current. Voltages of five to ten volts are generally preferred in practice.

Increasing voltage above the preferred range of five to ten volts will allow for greater separation of electrodes as may be desirable in some arrangements. Further, smaller electrode surfaces may be employed to conserve manufacturing costs and optimize equipment size. However, this will result in increased current density with a concomitant increase in polarization resistance to thereby require higher voltage. Since increased voltage increases power costs, any practical design must entail a balancing of increased operating costs of greater power against savings in electrode material and efficiency gains that result from electrode placement and spacing. In general, preferred voltages will be below twenty-four volts and above five volts, selected in the light of the above-identified design considerations.

Electrode sizes should be such as to provide acceptable current density ranges. Generally, lower current densities are preferable to minimize polarization resistance. Again, this advantage will be balanced against additional cost of electrode material that is required to decrease current density. Smaller electrodes, although increasing current density, enable manufacture of the ionic pH generator in a compact form.

Current densities below ten amperes per square foot of electrode surface are preferable, although densities up to one-hundred amperes per square foot may be employed with sufficiently high flow water flow rate.

TYPICAL APPLICATIONS

Figure 3:
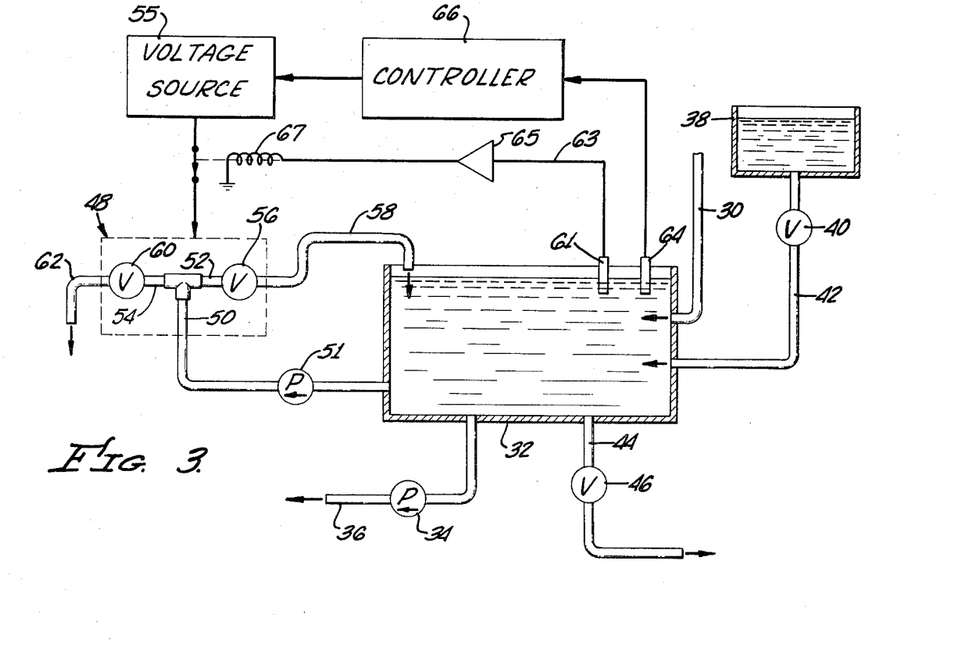
FIG. 3 illustrates application of the generator of FIG. 1 or FIG. 2 for automatic control of an aqueous system.

Illustrated in FIG. 3 are portions of a substantially conventional evaporative cooling system which may be of the general type described in any one of the above-mentioned patents to Norris, Bird et al., and Horner. With use of a recirculating system in which a cooling tower spray pond or evaporative condenser serves to dissipate heat, great economy in makeup water requirements may be achieved. With dwindling supplies of fresh cold water available for industrial cooling requirements, increased use is made of recirculating systems in which cooling water is used again and again.

In a typical system of this type, after flow of the circulating water through heat exchange equipment, the water is cooled in passing over the cooling tower. Water from the cooling tower, (not shown in FIG. 3) is collected via a line 30 and temporarily stored in a sump or cold well 32 where it is subjected to various treatments to facilitate reuse. Water is withdrawn from the cold well under force provided by a pump 34 and passed through a line 36 for return to the heat exchange equipment and cooling tower (not shown).

Water losses primarily due to evaporation must be continuously or periodically corrected by addition of makeup water. Further, since evaporation increases the concentration of the water, the total dissolved solids content must be periodically decreased by "blowdown," that is, replacing a portion of the water. Blowdown and water makeup are typically provided by means of a makeup water source 38, supplying fresh water through a valve 40 and a line 42. Concentrated water from the cold well 32 is discharged selectively via a line 44 and a valve 46. Manual or automatic control of blowdown and/or the makeup supply are conventionally provided by means such as conductivity sensing and a water level indicator (not shown).

In addition to blowdown and makeup water supply, water of the evaporative cooling system is treated by conventional means (not shown in FIG. 3) with suitable inhibitor which may be added either manually or automatically as for example in response to colorimetric analysis of the water.

As previously indicated, the water system also must make provision for pH control. In the past, costly, complex and potentially hazardous acid storage systems have been employed which must be carefully constructed and continuously monitored. In fact, the hazards are so widespread and of such concern that special manuals are issued. For example, a manual prepared by the Manufacturing Chemists' Association of the United States delineates complete precautions to be followed when handling sulfuric acid, with particular reference to unloading of tank cars and trucks. Drip and siphon feed systems, constant rate feeders, proportional feeders, special pumps, filters and dilution equipment all have been employed for adding acid to large recirculating water systems.

In accordance with the present invention, such complex, costly, and potentially dangerous equipment is not employed, nor is it needed. Instead, an electrochemical acid generator 48 arranged substantially as illustrated and described in connection with FIG. 1 or FIG. 2 is provided to receive water withdrawn from the cooling tower cold well, electrolyze a portion of this water and return such portion bearing a high concentration of hydrogen ions into the circulating water system.

As illustrated in FIG. 3, an electrochemical acid generator 48, has a main conduit 50 connected to receive a supply of water drawn from cold well 32 by means of a pump 51. Main conduit 50 divides into an anodic branch 52 and a cathodic branch 54, each containing an electrode, as previously described. The electrodes are energized from a voltage source 55. Hydrogen ions generated in the anodic chamber or branch 52, and the liquid containing such ions, are fed via a valve 56 and a return line 58, to the sump or cold well 32 of the circulating water system. Water flowing through the cathodic chamber or branch 54 is discharged via a valve 60 and a drain line 62.

A conventional pH meter 64 generates an electrical signal indicative of pH of water in the cold well. This signal is fed to a controller 66 that varies the voltage provided by source 55 across the two electrodes of the electrochemical generator 48.

In operation, water is continuously drawn from cold well 32 at a rate determined by pump 51 and the total flow restrictions provided by adjustable valves 56 and 60, collectively. Further, the differential flow in conduits 52, 54, is also adjusted as necessary or desired by individual adjustment of valves 56, 60. Hydrogen ions are generated at the electrode in chamber 52. Hydroxyl ions are generated at the electrode in chamber 54. There is a relatively short and totally unobstructed path between the electrodes in chambers 52 and 54. Nevertheless, the velocity of flow of the liquid through respective chambers is such as to prevent diffusion of the hydrogen and hydroxyl ions through the liquid toward each other. Accordingly, most of the hydroxyl ions are carried off through line 62 and discharged from the system. Most of the hydrogen ions, on the other hand, are carried with the returning fluid in line 58 to the cold well 32 whereby the pH of the circulating water is lowered.

The magnitude of the electrolytic action depends in part upon the magnitude of the voltage impressed across the electrodes in the anode and cathode chambers 52, 54. Thus, an increase in the voltage applied by source 55 produces an increase in concentration of hydrogen ions produced in anodic chamber 52 and thereby still further lowers the pH of liquid returning to the system via line 58.

Should the pH of liquid in the cold well 32 increase above a predetermined value, the signal provided by pH sensor 64 will operate controller 66 to effect an increase in the voltage provided to the electrodes by the voltage source 55. As indicated above, this increase in voltage decreases the pH of returning liquid. Conversely, when the signal provided by pH sensor 64 indicates a pH below a predetermined level, controller 66 will effect a decrease of the voltage provided by source 55 whereby a lesser concentration of hydrogen ions is produced for the liquid in return line 58.

Particular details of construction and operation of the described closed-loop control, and of the controller and voltage source may be varied as deemed suitable for a particular application. The controller may be of the on-off type wherein a fixed current flow is passed through the electrochemical cell when sensed pH of the water system is different from the desired pH by more than a specified amount. In this type of controller current flow from the voltage source is stopped when the difference between sensed and desired pH of the water is within a specified tolerance. The system described above is such an on-off system.

Alternatively, the controller may be of the proportional type wherein the voltage impressed across the electrochemical acid generator is made proportional to the magnitude of the difference between sensed and desired pH of the main water system. Such a control system may be bi-directional and proportional; that is, it may provide both an increase and decrease of the magnitude of voltage provided by the voltage source in accordance with both sense and magnitude of the difference between actual and desired pH as signalled by the pH detector 64.

It is preferred to regulate the amount of pH change of the water in cold well 32 that is provided by the electrochemical acid generator 48, by means of varying the voltage impressed across the electrode. Nevertheless, it will be readily appreciated that the described generator can be controlled in other fashions. For example, increase of pumping rate of pump 51 will increase the flow of liquid past the anodic chamber and its electrode whereby the hydrogen ion concentration of the water in cold well 32 is increased at a greater rate. Conversely, decrease in the pumping rate of pump 51 will cause lesser flow of hydrogen ion bearing liquid into the cold well 32 to thereby lower its pH more slowly.

The electrochemical acid generator may be controlled in a similar fashion by operating one or both of valves 56, 60 to further restrict either the total flow through both chambers 52, 54, or to increase or restrict the flow through either of chambers 52, 54.

Although in the arrangement of FIG. 3, a separate pump 51 is employed to withdraw liquid from the cold well 32 and to flow it through the conduits of the electrochemical generator, it will be readily appreciated that circulating pump 34, employed to achieve liquid flow through the primary return line 36 and thence to the system heat exchanger, may also be used for this purpose. In such an arrangement, pump 51 is not needed and supply conduit 50 is simply connected to the line 36 to receive a portion of the liquid under pressure provided by the pump 34.

The system illustrated in FIG. 3 is simple, inexpensive and reliable. Nonetheless, like all equipment it is subject to possible failure. For optimum safety, therefore, an override mechanism may be provided to stop the addition of acid or base to the water when some characteristic affected by pH indicates an upset of the system. For example, a corrosion sensing device 61 responsive to corrosion characteristics of the water will generate a signal on lead 63 that is indicative of or proportional to corrosion rate of the system. This corrosion rate signal on lead 63 is fed via an amplifier 65 to a coil 67 of a relay having its contacts in series in the line between voltage source 55 and the electrochemical generator. Accordingly, when corrosion rate sensed by corrosion instrument 61 goes above a predetermined value, relay coil 67 is operated to open the relay contacts and de-energize the electrodes of the acid generator.

Such corrosion sensing instrument may be any one of the well known electric resistance corrosion measuring devices such as that shown in Pat. 2,987,685 to E. Schaschl, for example, or one of the polarization resistance type instruments such as described in U.S. Pats. 3,069,332, 3,156,631 and 3,250,689 to R. G. Seyl. Such corrosion sensing instruments are sold by Magna Corporation of Santa Fe Springs, California, under the trademarks "Corrosometer" and "Corrater."

Alternatively, such additional sensing instrument 61 may be a second pH meter set to provide its override operation at a pH below that to which the system is normally controlled. It is known that in water systems such as those described herein, pH is a significant element in the corrosive rate of the system. Stated in another way, corrosion rate is a characteristic of the system that is significantly affected by pH. Accordingly, either one or both of instrument sensors 61 and 64 may be either corrosion or pH sensing devices that provide either a direct control of pH or the illustrated override of closed-loop pH control.

Figure 4:
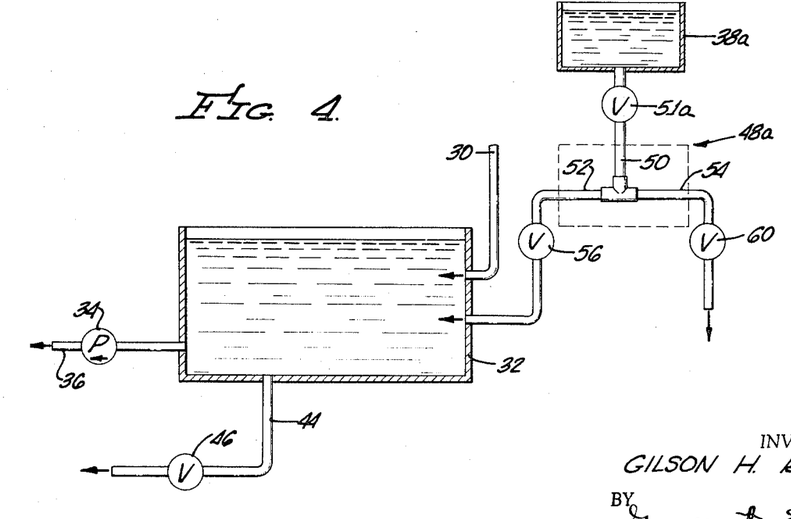
FIG. 4 shows a modified form of the system of FIG. 3.

Various arrangements and locations of the supply and return conduits 50 and 58 of the electrochemical acid generator are readily available. Although a substantially closed system is shown in FIG. 3, wherein supply to the acid generator is derived from the aqueous system itself, it will be readily appreciated that the acid generator or (base generator as required) may have an entirely separate liquid feed. As shown in FIG. 4, a separate tank 38a containing a liquid having substantially neutral pH and suitable content of ionizing compounds is arranged to supply liquid via a valve 51a to the supply conduit 50 of an acid generator 48a, substantially similar to those described above. Suitable electrodes and a voltage source (not shown in this figure) arranged as previously described, are provided whereby liquid flowing through the anodic chamber 52 of the acid generator flows to cold well 32 via the valve 56 and liquid flowing through cathodic chamber 54 is discharged via valve 60.

Instead of having tank 38a comprise a separate tank that is used solely to provide feed for the electrochemical acid generator, tank 38a may be the tank normally used to provide the makeup water for the system. In such an arrangement, the various valves, 51a and 56 in particular, will be opened to a degree and/or for periods ensuring a proper flow of makeup water into the system. Where flow of makeup water is required but the pH is not to be changed, valves 51a and 56 remain open, valve 60 is closed and voltage from the voltage source (not shown in FIG. 4) is either diminished or stopped entirely. It will be readily appreciated that various arrangements and combinations of both the makeup water and pH control function may be combined in accordance with the dictates of different situations.

Tank 38a of FIG. 4 may be used in still another fashion. Cooling water systems of the type described, and many other industrial water systems, employ an intermittent or continuous feed of a corrosion inhibitor in the form of sodium chromate or polyphosphates. Conveniently, such inhibitor may be stored in the tank 38a and provided to the system from this tank. Thus the liquid supplied to the electrochemical acid generator 48a shown in FIG. 4 may be the makeup water of the system to which inhibitor has been added. In such an arrangement, as previously mentioned, the chloride anion content may be substantially eliminated from the water within the makeup tank 38a. The necessary ionizing salts, chromates and phosphates, are provided by the inhibitor.

In the arrangements described above, and also in those to be described below, the flow past the electrode in the branch that returns to the system will not affect the level of the water in the system since all of the water in this branch is returned, none is lost. However, in some systems, the amount of water lost through the branch that is discharged (the cathodic branch in a system wherein pH is to be lowered) may form part of the bleed of the system so that a relatively small amount of continuous bleed is provided. Alternatively, such flow through the discharging branch may be minimized by differential control of the valves in the two branches, although flow through the discharge branch should never be completely stopped for significant periods of time while the acid generator is in operation. As previously described, it is the flow rate through that branch returning to the system that is of primary significance. Accordingly, in a system such as illustrated in FIG. 4, the valves 56 and 60 may be conditioned to provide a much larger flow in branch 52 than in branch 54, resulting in an increase in concentration of hydroxyl ions in the branch of lower flow rate but causing no adverse effects on operation of the described arrangement.

The electrochemical acid or base generators previously described are positioned externally of the cold well and externally of the main body of liquid of which pH is to be controlled. It will be readily appreciated that the acid or base generator of the present invention may be arranged wholly or partially within or mounted upon the walls of the cold well and in close fluid communication therewith.

Figure 5:
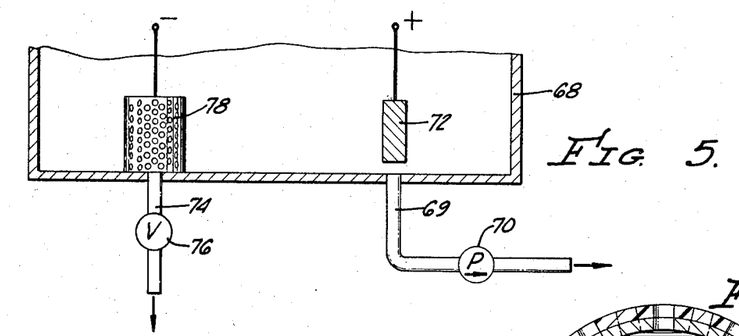
FIG. 5 illustrates an alternate location and arrangement of the electrochemical acid or base generator.

In the internally mounted system illustrated in FIG. 5, circulating liquid is drawn from a liquid tank or cold well 68 via a line 69 and a circulating pump 70. Anode 72 of the electrochemical acid generator employed in this arrangement is suitably mounted within the cold well 68 in proximity to the connection of the line 69 to the tank. Accordingly, there is achieved a relatively high flow rate of liquid over and past the anode 72.

The cold well includes a bleed or drain line 74 under control of a drain valve 76. A cathode 78 of the electrochemical generator is interposed in the discharge flow, positioned directly at the connection of bleed line 74 to the cold well. The electrodes are connected to a voltage supply (not shown).

Figure 6:
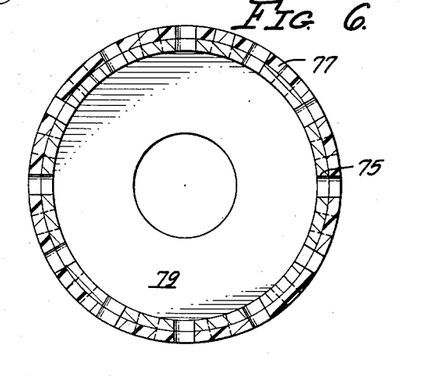
FIGS. 6 and 7 illustrate an electrode adapted for use in the arrangement of FIG. 5.
Figure 7:
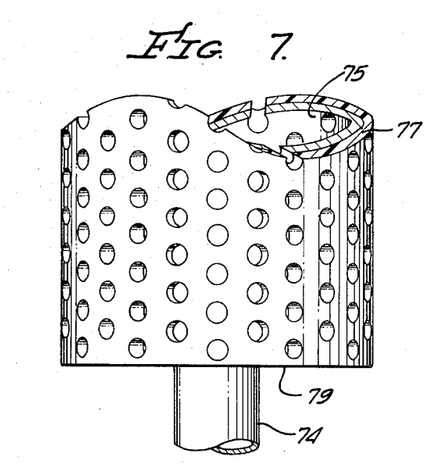

As shown in FIGS. 6 and 7, the cathode that is employed for the electrochemical generator when the latter is mounted within the liquid to be controlled, comprises a substantially cylindrical open-ended and multi-apertured electrical conductor 75 which is secured to and mounted within a multi-apertured insulating tube 77. Apertures of tube and electrode are in registry with each other. Insulating tube 77 is substantially closed at the bottom end as indicated at 79 except where it is connected to the bleed line 74 of the liquid tank 68.

Cathode 78 is larger than the anode and accordingly is subjected to lower flow rate and lower current density. Water bled from tank 68 enters the hollow cathode through the perforations in the electrode and thence through the bottom of the insulating tube to the drain line 74. The cathode of FIGS. 6 and 7 is similar in concept to that illustrated in FIG. 2; however, the circular form of this electrode provides for increased efficiency and improved entrainment of products electrochemically generated at this electrode. Other configurations and arrangements of both anode and cathode may be employed for an electrochemical generator that is mounted wholly or at least partially within the liquid tank or the fluid conduits connected therewith, as will be apparent from the description herein.

In the arrangement of FIG. 5, one electrode (the cathode in the case of acidic generation) is located closely adjacent to, or actually within a system discharge line. The other electrode can be positioned in either an incoming or outflowing stream of the tank, since in either case flow past this electrode remains in the system.

If deemed necessary or desirable, closed-loop control of the system of FIG. 5 may be provided by the control apparatus 55, 61, 63, 64, 65, 66, 67 described in connection with the embodiment of FIG. 3.

The arrangement of FIG. 5, like the others described herein, may be employed to supply hydroxyl ions rather than hydrogen ions to raise pH of the liquid in tank 68.

Chemical treatments and in particular, precision control of pH, are most commonly used in circulating water systems. Yet there are many different types of systems of the once-through type employed where copious water supplies are available, where the nature of use of the water prevents its economical reuse or where the water is actually consumed in use. In these systems, the water must be subjected to what has been termed external chemical treatment; that is, treatment before it is supplied to its place of use. Such chemical treatment frequently includes pH control. The electrochemical acid or base generator of the present invention is readily adaptable to such application.

Figure 8:
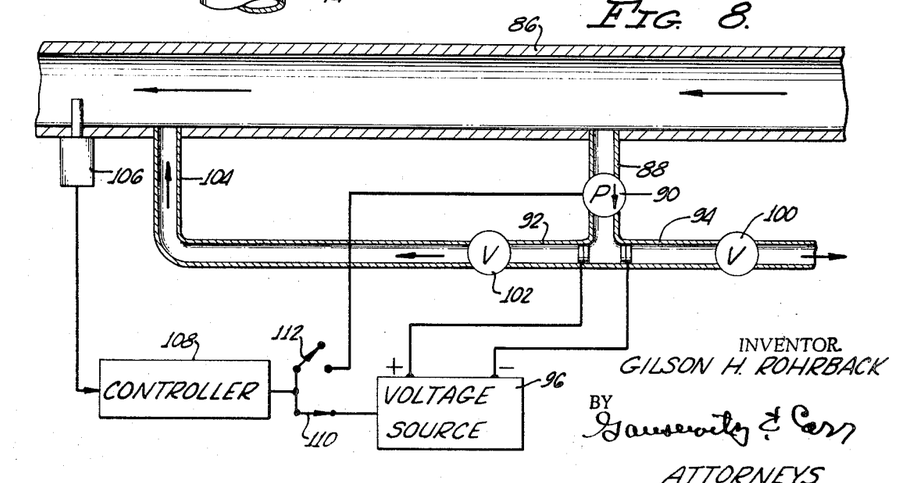
FIG. 8 illustrates application of the electrochemical acid or base generator of this invention to a once-through system.

As illustrated in FIG. 8 for example, a once-through system includes a conduit 86 through which an aqueous liquid of which the pH is to be controlled flows from right to left as indicated by the arrows. To control pH in this once-through system, liquid is withdrawn from the conduit 86 via a supply conduit 88 under pressure of a pump 90 which feeds the liquid to a T having anodic and cathodic branches 92, 94, respectively. As previously described, the two chambers of the acid generator, anode and cathode respectively, are in close proximity to each other with an unobstructed liquid path therebetween. A voltage source 96 is provided to impress a suitable voltage across the electrodes. Where pH is to be lowered, the liquid in the cathodic branch 94 is discharged via a valve 100. Liquid in the anodic branch 92 is caused to flow through a valve 102 and a return line 104 to be mixed with the liquid flowing in the primary conduit 86 at a point downstream from the conduit 88.

For closed-loop control of pH of the downstream liquid, a conventional pH sensing instrument 106 feeds to a controller 108 a signal proportional to or indicative of pH of downstream liquid. Controller 108 feeds a control signal via a first switch 110 to the voltage source 96 to thereby provide either an on-off or proportional control of the voltage. As previously described, this controls the change of pH that is achieved by the acid generator.

Also illustrated in FIG. 8 is an alternate arrangement for closed-loop regulation of the amount of pH control achieved by the system. For such alternate arrangement, the signal provided by controller 108 is fed through a second switch 112 (illustrated in open positon) when the latter is in the closed position thereof and thence to control the pumping rate of pump 90. The pH control signal from controller 108 may be fed through either one or both of switches 110 and 112 so that either the voltage source or the pump rate may be controlled independently or both may be controlled concomitantly.

Although pump 90 may be provided to enable precision control of flow rates, it will be readily seen that the inherent pressure difference between the point of withdrawal and point of return of liquid drawn from the main conduit 86 of FIG. 8 may itself be sufficient to provide the required flow through the electrochemical acid or base generator.

In such case, pump 90 and switch 112 are not needed and control is provided only via switch 110.

Other arrangements for effecting controllable operation of the acid or base generator of this invention are contemplated. For example, if flows from both cathodic and anodic branches are arranged to be either selectively returned to the system or discharged, maximum flexibility of function is achieved. In such arrangement all of the anodic flow, or all of the cathodic flow, or any relative-proportion of the two may be either discharged or returned to the system.

There have been described methods and apparatus for achieving low cost electrochemical pH control without the use or handling of hazardous chemicals and with a minimum of uncertainty, risk and expense. The described arrangement of electrolyzing a liquid and selectively employing the pH changing ions generated thereby, provides a simple and convenient manual or automatic control of pH in water systems and minimizes possibilities of chemical overtreatment due to mechanical failures. The described methods and apparatus are simple, inexpensive, convenient, and readily adaptable to a wide variety of different water systems.

The foregoing detailed description is to be clearly understood as given by way of illustration and example only, the spirit and scope of this invention being limited solely by the appended claims.

What is claimed is:

1. A method of lowering pH to minimize precipitation of scale in a recirculating cooling water system subject to evaporation and subject to increasing concentration of salts and dissolved solids, said method comprising the steps of:
   electrolyzing water of said system at anodic and cathodic electrodes having an electrolytic current carried therebetween,
   flowing water from said system past said anodic electrode at a first rate to entrain hydrogen ions generated at said anodic electrode,
   returning to said system substantially all of the water flowing past said anodic electrode,
   flowing water from said system past said cathodic electrode at a rate considerably less than said first rate, and
   discharging from said system substantially all of the water flowing past said cathodic electrode, whereby water of relatively lower pH flowing past said anodic electrode is returned to said system to lower the pH thereof and thereby decrease precipitation of salts.

2. The method of claim 1 including the step of blowdown of said system, said blowdown step comprising the steps of changing some of the water of said recirculating system by adding quantities of fresh makeup water and balancing the adding of makeup water by the combination of evaporation from said system together with said discharge of water flowing past said cathodic electrode.

3. The method of claim 1 including the step of treating the water of said system to decrease its corrosive properties, said treating step comprising the addition of corrosion inhibitors to add to the water in said recirculation system a concentration of ions other than those generated at the electrodes sufficient to carry the electrolytic current between the electrodes.

4. The method of claim 1 including the step of controlling the pH changing effect of water returning to said system from said anodic electrode in accordance with a characteristic of the water in said system that is affected by pH.

5. The method of claim 4 wherein said step of controlling pH changing effect comprises the step of sensing a characteristic of water in said system and is affected by pH, and increasing the rate of flow of water past said anodic electrode when said characteristic indicates a higher pH.

6. The method of claim 3 including the step of sensing pH of the water of said recirculating system, and controlling voltage between said electrodes in accordance with the sensed pH.

7. The method of claim 6 including the step of sensing a corrosive characteristic of water in said recirculating system, and overriding the control of voltage between the electrodes so as to stop the lowering of pH of the system when a corrosive condition is sensed.

8. The method of attenuating scale precipitation in a recirculating water cooling system that is subject to evaporation and influx of makeup water of relatively high pH and salt content, said method comprising the step of electrolytically controlling pH of water in the system to maintain the pH at a value sufficiently low to minimize precipitation of scale, said step of electrolytically controlling pH comprising:
   flowing water from said system past an anodic electrode at a first rate,
   flowing water from said system past a cathodic electrode at a second rate that is considerably less than said first rate,
   impressing electrical energy across said electrodes to cause an electrolytic current to flow therebetween,
   returning substantially all of the water flowing past said anodic electrode to said system, and discharging from said system substantially all of the water flowing past said cathodic electrode.

9. The method of claim 8 including the step of sensing a characteristic of water in said system that is affected by pH, and controlling the rate of flow of water past said anodic electrode so as to increase said first rate when an increased pH is sensed.

10. The method of claim 8 including the step of sensing a characteristic of said water that is affected by pH, and increasing the electrical energy impressed across said electrode when said characteristic indicates an increasing pH.

11. The method of claim 9 including the step of disabling said electrolytic control of pH when a corrosive condition is sensed.

12. The method of claim 10 including the step of disabling said electrolytic control of pH when a corrosive condition is sensed.

References Cited
UNITED STATES PATENTS

| | | | |
|---|---|---|---|
| Re. 26,329 | 1/1968 | Hougen | 204—149 |
| 1,276,386 | 8/1918 | McKibben | 204—149 X |
| 3,074,865 | 1/1963 | Gaysowski | 204—149 X |
| 3,202,601 | 8/1965 | Green | 204—149 X |
| 1,869,153 | 7/1932 | Kean | 204—151 |
| 2,341,356 | 2/1944 | Briggs | 204—151 |
| 2,535,035 | 12/1950 | Briggs | 204—151 |
| 2,546,254 | 3/1951 | Briggs | 204—151 X |
| 2,583,101 | 1/1952 | Oliver | 204—151 X |
| 2,681,885 | 6/1954 | Briggs | 204—151 |
| 2,848,402 | 8/1958 | Van Dorsser | 204—151 |
| 2,852,455 | 9/1958 | Hausner | 204—151 |
| 2,882,210 | 4/1959 | Jenks | 204—151 |
| 3,030,296 | 4/1962 | McGlasson et al. | 204—151 X |
| 3,441,488 | 4/1969 | Onstott | 204—151 X |

JOHN H. MACK, Primary Examiner
A. C. PRESCOTT, Assistant Examiner

U.S. Cl. X.R.

204—1 T, 147, 195 C, 195 R